United States Patent [19]

Hampshire

[11] Patent Number: 4,486,474

[45] Date of Patent: Dec. 4, 1984

[54] METHOD OF SIZING STRANDS

[75] Inventor: William J. Hampshire, Peninsula, Ohio

[73] Assignee: The Goodyear Tire & Rubber Company, Akron, Ohio

[21] Appl. No.: 531,792

[22] Filed: Sep. 13, 1983

[51] Int. Cl.³ .......................... B05D 1/18; B05D 3/02
[52] U.S. Cl. .................................... 427/296; 427/350; 427/386; 427/389.9; 427/398.4; 427/430.1
[58] Field of Search ............... 427/294, 296, 350, 386, 427/389.9, 430.1, 398.4

[56] References Cited

U.S. PATENT DOCUMENTS 3,384,505  5/1968  Palmer et al. ...................... 427/294

*Primary Examiner*—Michael R. Lusignan
*Attorney, Agent, or Firm*—H. C. Young, Jr.

[57] ABSTRACT

A method of sizing a filament in the form of a mat of strand filament wound into a roll by immersing the roll in a ketone solvent containing an unsaturated epoxy resin and polyamine curative therefor followed by removing said ketone under vacuum conditions to unblock said polyamine and allowing it to partially crosslink said epoxy.

9 Claims, No Drawings

METHOD OF SIZING STRANDS

FIELD OF INVENTION

This invention relates to the sizing of a continuous strand of filaments with a resin system. The invention is particularly applicable to the sizing of continuous filaments for use in reinforced plastics with a resin system which is the same or is compatible with the plastic to be reinforced.

BACKGROUND OF THE INVENTION

Fibers used in the preparation of reinforced plastics are sometimes pre-coated with a resin before being used as reinforcement. Such a resin coating is typically first applied to the fiber by various methods such as by the solution or molten coating of fiber with a curable composition followed by partially curing the coated fiber composite.

The usual purpose of the preliminary partial curing is to create a relatively dry handling and pliable fiber. A woven or random strand mat, or sheet, is typically then prepared from the coated fiber composite. The mat, or sheet, can later be molded by itself or with additional resin, during which additional curing takes place, to create a final, molded article.

A resin impregnation of fiber is disclosed for example, in U.S. Pat. No. 3,384,505 where a dry wound roll of continuous fiber or filament is placed in a vessel, a vacuum drawn to remove entrapped air in the roll and the roll then submerged in a liquid containing a heat curable, thermo-setting, composition which is initially free of cross-linking. Pressure is applied until the resin medium of resin catalyst and solvent has essentially filled the voids in the roll.

The patent teaches that the roll is removed from the remaining unabsorbed resin medium and heated to convert the resin to a partially cured state. The heating is taught to also tend to remove all or most of the solvents which were present in the original resin medium. By this method, the patent teaches, the fiber does not have to be unwound from its roll in order to be resin impregnated.

The patent more specifically teaches to treat glass fiber, wound in a roll, with an epoxy in solution of a solvent, such as for example, acetone, containing a catalyst or curative for the epoxy such as, for example, an amine. It is taught that the solvent should be present in an amount of about 10–300 weight percent of resin and curative.

However, it has been observed that when a dry, wound roll of continuous glass filament was submerged in an acetone solution of an epoxy containing an amine curative following by drying and curing the epoxy coating on the glass filament in accordance with such teaching, the curing was not controllable due to insulated exothermic reaction inside the roll even with refrigeration and the resultant coated, overcured (impregnated) glass filament was difficult to further process into a reinforced plastic product.

Thus, it is desired to have a method which can provide an epoxy coated fiber composite under controlled conditions.

In addition it is desired, for a number of composite plastic applications, that filaments be provided with an extremely small amount or very light coating of partilly cured epoxy thereon for the purpose of stabilizing the filaments. This is referred to herein as "sizing the filament" with a "sizing amount" of partially curved epoxy resin on the filament. The usual purpose is to provide "strand integrity" under controlled conditions.

Disclosure and Practice of the Invention

In accordance with this invention, a method of sizing a filament comprises the steps of A. Immersing a mat of continuous strand filament wound into the form of a roll in a liquid ketone solvent solution containing less than a saturation amount of unsaturated epoxy resin and polyamine cross-linking curative therefor in a container with a vapor space above said solution, where said ketone chemically blocks said polyamine from crosslinking said epoxy resin.

B. Soaking the immersed filament roll in said solution at substantially atmospheric pressure until the said roll is substantially saturated with said solution.

C. Applying a vacuum to said vapor space, to remove residual air and thereby more completely saturate said roll with said solution.

D. Removing the vacuum separating said roll from said solution, and placing said roll in a suitable container.

E. Applying a vacuum to said suitable container to remove residual ketone solvent from the roll, thereby unblocking said polyamine curative and allowing the curative to partially cross-link said epoxy on said filament to a "B" stage cure.

F. Removing said vacuum and recovering the roll of sized strand filaments having a partially crosslinked epoxy coating thereon in an amount of about 0.5 to about 15, preferably about 1 to about 10, weight percent of the filament and G. Cooling said roll of sized filament to at least 10° C. and preferably to at least 0° C. to stop the crosslinking reaction.

In the practice of this invention, the strand is comprised of a multiple of filaments. Such filaments can be in the form of a roving or cabled filaments in the form of a yarn. Optionally the filaments or yarns can be woven into a form of a fabric.

The immersed roll is initially soaked in the ketone solution, typically at ambient temperature (20°–30° C.) and pressure (about atmospheric), until air bubbles stop rising to the surface of the solution from the submerged roll. The period of time has been observed to be about 0.5 to about 2 hours, although more or less time may be allowed.

The container is closed and a vacuum, or reduced pressure, is applied to the vapor space above the solution until additional bubbles stop rising. The conditions can typically be ambient. A vacuum in the range of about 100 to about 600 mm of mercury can be used although more or less vacuum can be applied, depending upon the rate of air removal desired. The precise time when air bubbles stop rising is not necessarily easy to determine, since inspection of the surface of the solvent in the closed container must be made on an intermittent basis, unless the container itself is transparent. Therefore, adequate time is to be allowed.

Alternately the initial soaking step (B) can be combined, if desired, with the vacuum step (C) by applying the vacuum substantially immediately upon immersing the roll in the solution.

In the description of this invention, although the actual amount of applied vacuum is not considered as being critical, the described ranges of vacuum are based on 760 mm mercury as being a total or absolute vacuum.

The purpose of the air removal under vacuum conditions is to remove residual air which may be contained or trapped in the roll and thereby more adequately saturate the roll of filament.

The vacuum is released and the roll removed from the solvent and preferably placed in another container instead of draining the solution from the first container in order to prevent or retard a film of contaminant from forming on the walls of the first container.

A vacuum is drawn on the roll in the second container to remove ketone solvent and unblock the amine curative.

This is a most important part of the process and especially distinguishes it over the prior process as it is understood (U.S. Pat. No. 3,384,505). In this invention, the crosslinking is more effectively controlled to provide a sized strand while it is in the roll. In practicing what is understood to be the prior art process, it has been observed that an uncontrolled crosslinking reaction can readily proceed within the roll before air is effectively removed from the roll, thereby providing a greater exothermic heat build-up of the roll mass and encapsulating the filament with a relatively thick and extensive coating as compared to a more minimal sizing amount of the resin obtained by the practice of this invention. Further, it was observed that it was more difficult to control the crosslinking of the resin and keep it from proceeding beyond a stage "B" cure with the process as understood from the patent's disclosure.

Indeed, it has been observed that the process of this invention provides a more controlled crosslinking of the resin coating, since the crosslinking rate is proportional to the rate of ketone solvent removal, under vacuum conditions, from the saturated roll. Moreover, the exothermic reaction can proceed at a reduced rate, thereby reducing heat build-up in the roll mass.

The stage "B" degree of cure relates to the extent of partial crosslinking of the epoxy coating so that the filament appears to be dry to the touch and can therefore be easily handled for additional shaping and other operations.

Later, at a future time, the epoxy can be cured or crosslinked beyond the stage "B" cure to a thermoset polymer. The viscosity of the epoxy at a "B" stage cure weight may typically be in the range of about 9,000 to about 15,000 poises at 25° C.

The coating is maintained at its "B" stage cure by cooling after the partial crosslinking step by cooling (refrigeration) usually down to at least 5° C. and preferably in the range of about 5° C. to about −10° C. or lower where it can be stored until ready for use.

It is to be appreciated that the sizing treatment time may be decreased in the vacuum container for solvent removal if air or inert gas, optionally warmed, is alternately or cyclicly flushed through the container at a temperature such as about 25° C. to about 50° C. to decrease the sizing treatment time to achieve the "B" stage cure.

It is important that the solution be less than saturated with both the epoxy resin and polyamine because settling or precipitation of the resin and curative to the bottom of the container prematurely unblocks the ketone-blocked reaction and a resulting excessive exothermic reaction in the mass of wound filament would be difficult to control and would probably produce a defective sized filament product.

The sized strand according to this invention can be further processed for use in the oriented fiber preforming technology relating filament winding, sheet molding compounds and "sprayup" processing.

In the practice of this invention, the amount of polyamine used is preferably in the range of about 20 pph to about 35 pph (parts per 100 parts by weight) of epoxy.

Typically, the solution contains about 5 to about 20 weight percent of the epoxy resin and about 2 to about 6 percent by weight of the polyamine.

The preferred solution concentration may be controlled by hydrometer measurement. Usually a specific gravity (at about 25° C.) of about 0.84 to 0.85 is satisfactory in order to both prevent a saturated solution from occurring and to control resin pick-up on the strand.

In the practice of this invention, the filaments can be of various fiber materials such as glass, carbon, polyester, nylon or aramid or a combination of such filaments.

The unsaturated epoxy resin is typically a liquid epoxy resin preferably having a molecular weight in the range of about 300 to about 600 and a viscosity at 25° C. in the range of about 3,000 to about 35,000 centipoise and an epoxide equivalent in the range of about 160 to about 500, preferably about 170 to about 190.

Representative of such epoxy resins are diglycidyl ethers of Bisphenol A, epoxy novalac resin and cycloaliphatic epoxide where the cycloaliphatic substituents are epoxidized olefinic radicals where the total carbon atoms of all the substituents is in the range of about 7 to about 26. The diglycidal ether of Bisphenol A is preferred.

The polyamines for this invention can be selected from primary and secondary aromatic and aliphatic polyamines. It is usually preferred that they are diamines.

Representative examples of aromatic amines are methylene dianiline (MDA), meta phenylene diamine (MPDA), diamino diphenylsulfone (DADS), m-xylylene diamine, orthophenylene diamine and diethyl 2,4 toluenediamine. The MDA, and MPDA are preferred.

Representative examples of aliphatic diamines are diethylene triamine (DETA), triethylene tetramine (TETA), tetraethylene pentamine (TEPA), diethylaminopropylamine, monoethanolamine, aminoethylpiperazine, amino ethyl ethanolamine and 1,2 diaminocyclohexane.

The DETA and TETA are preferred.

Representative examples of liquid ketones are acetone, methyl ethyl ketone, (MIBK) methylisobutylketone, diethyl ketone, tertiary butyl methyl ketone 2-hexanone, 3-hexanone and cyclohexanone.

The practice of this invention is further illustrated by reference to the following example which is intended to be representative rather than restrictive of the scope of the invention. Unless otherwise indicated, all parts and percentages are by weight.

EXAMPLE

A filamentary glass roving composed of about 1600 to about 2000 filaments per strand was obtained in the form of a roll thereof having a roll diameter of about 30.5 cm a width of about 33 cm and an open core diameter of about 15 cm (obtained as Hybon 2078-675 with Hybon understood as being a trademark of the PPG Industries company). The term "roving" refers to strand of uncabled filaments. Thus the filaments in the strand were essentially parallel to each other. The strand was of a continuous length with a weight of about 735 gm/km, a width of about 2.5 mm and composed of filaments having a diameter of about 9.6 to about 24.8 micro millimeters.

The filament roll was weighed, placed in a container and immersed in an acetone solution at ambient conditions with a temperature of about 23° C. and atmospheric pressure. The acetone solution was composed of, based on 100 parts acetone, 3.98 parts by weight methylene dianiline and 13.26 parts by weight epoxy resin as a diglycidyl ether of Bisphenol A having a molecular weight of about 300 and an epoxide equivalent of about 174 as DER 332 from the Dow Chemical Company. The acetone solution was less than saturated since there was no observed precipitation of the diamine or epoxy. The solution specific gravity was 0.844 as measured by hydrometer at about 23° C.

The acetone solution had been prepared by weighing the ingredients and mixing them in the immersion container.

A vapor space was provided above the acetone solution containing the immersed roll.

The immersed roll was allowed to soak in the acetone solution for about fifteen minutes until air bubbles stopped rising to the surface of the solution.

Then a vacuum (reduced pressure) of about 660 mm mercury, (on a basis of 760 mm being absolute vacuum), was drawn on the vapor space above the solution for about one hour to remove residual air from the immersed roll and aid in further saturating the roll.

The roll was removed from the solution, allowed to drip dry, placed in a second container and a vacuum (reduced pressure) of about 660 mm mercury applied for at least 24 hours and until no acetone odor was detected. An ambient temperature was used for this step of about 23° C.

As the residual acetone was removed from the roll by evaporation under vacuum conditions, the diamine chemically became unblocked and the unblocked diamine partially crosslinked the epoxy to the desired "B" stage on the filaments.

The roll was then re-weighed to determine the resin sizing content on the roving strand as follows:

Weight of roll before immersion: 23,898 grams
Weight of roll after solvent removal and epoxy "B" stage crosslinking: 24,712 grams
Resin coating weight: 814 grams
Resin coating weight/filament weight: 3.41%

Preforms were formed for the purpose of making compression molded composite wheels by the following procedure.

The sized continuous strand of filaments, with enhanced strand integrity, was chopped by an automated machine into a multiplicity of lengths ranging from about 1 to about 8 inches as the machine may have been programmed to chop.

The chopped, sized strands were then directionally oriented by the machine and pressed to form a shaped article (preform). The preform was sprayed with mixture of epoxy resin of the glycidylether-bisphenol A type containing a diamine crosslinker.

The resulting composite was then compression-molded at about 160° C. for about ¼ hours to crosslink the strand sizing past its "B" stage precure state together with the sprayed-on epoxy and form a shaped, rigid, fiber-reinforced thermoset epoxy article.

While certain representative embodiments and details have been shown for the purpose of illustrating the invention, it will be apparent to those skilled in this art that various changes and modifications may be made therein without departing from the spirit or scope of the invention.

What is claimed is:

1. A method of sizing a filament which comprises the steps of
    A. Immersing a mat of continuous strand filament wound into the form of a roll in a liquid ketone solvent solution containing less than a saturation amount of unsaturated epoxy resin and polyamine cross-linking curative therefor in a container with a vapor space above said solution, where said ketone chemically blocks said polyamine from crosslinking said epoxy resin.
    B. Soaking the immersed filament roll in said solution at substantially atmospheric pressure until the said roll is substantially saturated with said solution.
    C. Applying a vacuum to said vapor space, to remove residual air and thereby more completely saturate said roll with said solution.
    D. Removing the vacuum separating said roll from said solution, and placing said roll in a suitable container.
    E. Applying a vacuum to said suitable container to remove residual ketone solvent from the roll, thereby unblocking said polyamine curative and allowing the curative to partially cross-link said epoxy on said filament to a "B" stage cure.
    F. Removing said vacuum and recovering the roll of sized strand filaments having a partially crosslinked epoxy coating thereon in an amount of about 0.5 to about 15 weight percent of the filament and
    G. Cooling said roll of sized filament to at least 10° C. to stop the crosslinking reaction.

2. The method of claim 1 where said strand is a multiple of filaments in the form of roving or cabled filaments in the form of a yarn.

3. The method of claim 1 where said filaments are of fiber selected from at least one of glass, carbon, polyester, nylon and aramid.

4. The method of claim 3 where said unsaturated epoxy resin has a molecular weight in the range of about 300 to about 600, a viscosity at 25° C. in the range of about 3000 to about 35,000 centipoise and an epoxide equivalent in the range of about 160 to about 190; where said polyamine is selected from primary and secondary aromatic and aliphatic diamines and where said ketone is selected from at least one of acetone, methyl ethyl ketone and methyl isobutyl ketone.

5. The method of claim 3 where said epoxy is selected from at least one of diglycidyl ether of Bisphenol A, epoxy navalac resin and cycloaliphatic epoxide where said cycloaliphatic substituents are epoxidized alefinic radicals; where said polyamine is selected from at least one of methylene dianiline, meta phenylene diamine, diamino diphenylsulfone, m-xylylene diamine, orthophenylene diamine, diethyl 2,4 toluene diamine, diethylene triamine, tetraethylene pentamine, diethylaminopropylamine, aminoethylpiperazine, amino ethyl ethanolamine and 1,2-diaminocyclohexane and said ketone is selected from at least one of acetone, methyl ethyl ketone, tertiary butyl methyl ketone, 2-hexanone, 3-hexanone and cyclohexanone.

6. The method of claim 3 where said epoxy is a diglycidyl ether of Bisphenol A having a molecular weight in the range of about 300 to about 600 and an epoxide equivalent in the range of about 170 to about 190, where the polyamine is selected from at least one of methylene dianiline, meta phenylene diamine, diethylene triamine and tetraethylene pentamine and where said ketone is selected from at least one of acetone, methyl ethyl ketone and methyl isobutyl ketone.

7. The method of claim 5 where said ketone solution has a specific gravity (25° C.) in the range of about 0.84 to about 0.85 and the sized filaments have said partially crosslinked epoxy coating thereon in an amount of about 1 to about 10 weight percent of the filament.

8. The method of claim 1 where said steps (B) and (C) are combined.

9. The method of claim 6 where steps (B) and (C) are combined.

* * * * *